(12) United States Patent
You et al.

(10) Patent No.: US 10,864,670 B2
(45) Date of Patent: Dec. 15, 2020

(54) METHOD, DEVICE AND INJECTION MOLDING MACHINE FOR MANUFACTURING CLAMPING RING

(71) Applicant: Yueqing Dongbo Electromechanical Co., Ltd., Zhejiang (CN)

(72) Inventors: Yixian You, Zhejiang (CN); Hongbing Li, Zhejiang (CN)

(73) Assignee: Yueqing Dongbo Electromechanical Co., Ltd., Zhejiang (CN)

( * ) Notice: Subject to any disclaimer, the term of this patent is extended or adjusted under 35 U.S.C. 154(b) by 290 days.

(21) Appl. No.: 15/838,376

(22) Filed: Dec. 12, 2017

(65) Prior Publication Data

US 2019/0126528 A1 May 2, 2019

(30) Foreign Application Priority Data

Nov. 1, 2017 (CN) .......................... 2017 1 1057943

(51) Int. Cl.
*B29C 48/30* (2019.01)
*F16L 47/00* (2006.01)
*B29C 48/03* (2019.01)
*B29C 48/00* (2019.01)
*B29L 31/24* (2006.01)

(52) U.S. Cl.
CPC .......... *B29C 48/30* (2019.02); *B29C 48/0017* (2019.02); *B29C 48/03* (2019.02); *F16L 47/00* (2013.01); *B29L 2031/24* (2013.01)

(58) Field of Classification Search
CPC ..... B29C 48/30; B29C 48/0017; B29C 48/03; B29L 2031/24; F16L 47/00
See application file for complete search history.

(56) References Cited

U.S. PATENT DOCUMENTS 4,514,159 A * 4/1985 Magerle ................. B29C 43/18
425/125
5,498,150 A * 3/1996 Check ..................... B29C 33/04
264/528

(Continued)

FOREIGN PATENT DOCUMENTS

CN 1100361 3/1995
CN 101243280 6/2014

(Continued)

*Primary Examiner* — Peter L Vajda
*Assistant Examiner* — S. Behrooz Ghorishi
(74) *Attorney, Agent, or Firm* — JCIPRNET

(57) ABSTRACT

Disclosed are a method, an extruder and an injection molding machine for manufacturing a clamping ring, solving problems that products produced by an extrusion method needs to be processed in two steps. The key point of technical solutions lie in a molding step of acting on a pipe member in a plastic melt state via a molding die set, to form a clamping ring from the pipe member; an injection mold injects plastic materials having memory properties through an injection gate to form a pipe member in the molding cavity, the pipe member comprises a clamping ring and a sealing film provided on one end of the clamping ring, the hydraulic mechanism drives a molding cutter to cut out a joint of the sealing film and the clamping ring in a plastic melt state, thereby a limit end is formed at one end of the clamping ring.

10 Claims, 23 Drawing Sheets

(56) References Cited

U.S. PATENT DOCUMENTS

2009/0014116 A1* 1/2009 Takada .................... B29C 43/28
156/209
2010/0199469 A1* 8/2010 Hedstrom ............... B29C 57/00
24/570

FOREIGN PATENT DOCUMENTS

EP 0530387 3/1993
EP 1741968 1/2007

* cited by examiner

METHOD, DEVICE AND INJECTION MOLDING MACHINE FOR MANUFACTURING CLAMPING RING

CROSS-REFERENCE TO RELATED APPLICATION

This application claims the priority benefit of China application serial no. 201711057943.8, filed on Nov. 1, 2017. The entirety of the above-mentioned patent application is hereby incorporated by reference herein and made a part of this specification.

TECHNICAL FIELD

The present invention relates to a method, a device and an injection molding machine for manufacturing a clamping ring.

BACKGROUND

It is known that, after one end of a pipe made by plastic materials having memory properties expand, a connecting piece is inserted into the expansion end, the expansion end of the pipe is then automatically restored to its original state and form after expansion; the connecting piece is generally made of a metal; the connecting piece is kept in the expansion end of the pipe until the expansion end contracts to a degree that the connecting piece can be firmly fixed. Based on the foregoing, a clamping ring with the same material as the pipe surrounds the expansion end and expand and contract together with the pipe, so that the sealing pressure maintained at the connecting area of the pipe according to the concept of the present invention can be enhanced.

EP0530387 disclosed a solution of manufacturing a clamping ring, that is, the clamping ring is made by extruding a pipe and the pipe is cut to a predetermined length to form the clamping ring; EP1741968 disclosed a clamping ring is formed by injection molding.

The Chinese Patent CN101243280B disclosed an annular stop edge is provided on a clamping ring, and the annular stop edge comprises a protrusion extending inward for ensuring that the clamping ring is kept being positioned in the correct place on the pipe after the pipe is connected. If the process of extruding the pipe is adopted, the annular stop edge and the protrusion are formed through thermal forming after being cut and cooled, so that appropriate protrusions and other desired shapes can be formed at one end of the clamping ring, and a limit edge can be formed, therefore, it is necessary to process in two steps, and the processing efficiency is low.

If injection molding is adopted, two lateral injection gates or one injection gate at one side is used to feed and weld lines are formed. However, the injection molding process has the following problems: positions of weld lines converging at 0 degree angle, the long length of the weld lines and being poor in quality, and being difficult in exhausting gas. A preferred solution is to carry out injection molding from the central injection port on the top, but the shape of the molded product is changed, so that the strength of the weld line of the finished product is guaranteed. If injection molding is performed in this manner, products need a secondary processing to punch and cut-out the top materials, which has a problem that the production efficiency is not high.

SUMMARY

According to one aspect of the present invention, there is provided a method for manufacturing a clamping ring with an extruder, and by means of this method for manufacturing a clamping ring, the end of the clamping ring can be molded in a plastic melt state, so the production steps can be optimized, and the production efficiency can be improved.

In order to achieve the above objective, an implementation of the present invention provides a method for manufacturing a clamping ring configured for use on a pipe joint. The method sequentially comprises: (a) an extruding step of extruding plastic materials having memory properties from an extruder; (b) an in-mold step of putting the extruded plastic materials into a molding cavity; (c) a molding step of acting on plastic materials in a plastic melt state via a molding die set, thus to form a clamping ring from a pipe member; and (d) a demolding step of taking out the clamping ring from the molding cavity to realize cutting-stock.

By adopting the above technical solutions, a previous process that a product needs to be reprocessed after a cooling step has been changed, and the end of the pipe member can be processed and molded with the pipe member being in a plastic melt state. Since molding can be performed more easily in a plastic melt state, the molding steps are optimized, and the production efficiency is improved.

According to a concept of the present invention, step (a) particularly comprises extruding continuous tubular extrusion pipe having memory properties from the extruder, and step (b) particularly comprises cutting the extrusion pipe at the other end after being delivered to the molding cavity, to form an independent pipe member.

By adopting the above technical solutions, the extrusion pipe is cut off after the extruder extrudes the tubular extrusion pipe, in this way, an independent pipe member is formed in the molding cavity, and then the pipe member is molded, so the molding is high in efficiency, and the product is high in quality.

According to a concept of the present invention, step (c) particularly comprises: (c1) a core-removing step of removing a core from the molding cavity and forming openings at both ends of the molding cavity; (c2) an extrusion molding step of entering a first molding die and a second molding die from the openings at both ends of the molding cavity, respectively, wherein, the second molding die extrudes one end of the pipe member in a plastic melt state to form a limit end extending radially around a circle center of the pipe member.

By adopting the above technical solutions, in step (c1), the core is removed from the molding cavity, getting ready for the subsequent molding; in step (c2), the first molding die and the second molding die move towards each other, respectively, and thus a die joint is formed, a limit end is formed at one end by extrusion and a first taper angle can be formed at the other end, and therefore, a desired shape can be molded all at once.

According to a concept of the present invention, step (a) particularly comprises extruding a specific amount of plastic materials from the extruder, and step (b) particularly comprises blowing the plastic materials into the molding cavity via a blow pipe.

By adopting the above technical solutions, after extruding a specific amount of plastic materials, only the said plastic materials are delivered into the molding cavity and then molded, so the processing efficiency is high.

According to a concept of the present invention, step (c) particularly comprises: (c1) a cap-sealing step of capping a sealing cap at an upper opening of the molding cavity, wherein a through hole is opened in a center of the sealing cap; (c2) an in-core molding step of dropping the core into the molding cavity via the through hole, extruding the plastic materials in the molding cavity to form a clamping ring with a sealing film.

By adopting the above technical solutions, the cap-sealing step is used to place plastic materials into the molding cavity, cap the upper end face, and then directly feed the core into the molding cavity, and in this way, the extruded plastic materials can be molded to a tubular shape all at once.

According to a concept of the present invention, a cooling step (c') of arranging cooling pipes in the inner wall of the molding cavity and within the core is performed synchronously with step (c).

By adopting the above technical solutions, the clamping ring within the molding cavity can be cooled synchronously with the molding process. To synchronously perform cooling and molding, so that the molding can be accelerated, and both the processing speed and production efficiency can be improved.

According to another aspect of the present invention, there is provided a device for manufacturing a clamping ring with an extruder, and by means of this device for manufacturing a clamping ring, the end of the clamping ring can be molded in a plastic melt state, so the production steps can be optimized, and the production efficiency can be improved.

In order to achieve the above objective, another implementation of the present invention provides a device for manufacturing a clamping ring, which comprise an extruder, wherein, a molding apparatus is provided adjacent to one side of the extruder, the molding apparatus is provided with a molding cavity, plastic materials having memory properties are extruded from the extruder and put into the molding cavity, and with the molding apparatus acting on plastic materials in a plastic melt state to form the clamping ring.

By adopting the above technical solutions, the plastic materials extruded by the extruder are placed into the molding cavity when the plastic materials are in a plastic melt state, and the clamping ring is formed by acting on plastic materials in a plastic melt state, therefore, the production steps of the process are optimized, and the production efficiency are improved.

According to a concept of the present invention, the extruder extrudes continuous tubular extrusion pipe having memory properties, the molding apparatus is a dividing plate rotatable along a circle center, a plurality of molding cavities rotating along with the dividing plate are arranged in the circumferential direction of the dividing plate, each molding cavity has an opening towards the direction of the extruder for entrance of the extrusion pipe, an independent pipe member is formed after the extrusion pipe is entered to the molding cavity, and the pipe member in a plastic melt state rotates with the dividing plate and is acted in a molding station by the molding die set, to form a clamping ring.

By adopting the above technical solutions, for the molding apparatus comprises a dividing plate, and the dividing plate can rotate, during the rotation, the dividing plate is operated gradually at each station, and is processed by the molding apparatus after rotated to the molding station to finally form a clamping ring, then a round of molding of the clamping ring is complete, and meanwhile, the dividing plate goes to process the next incoming pipe member, therefore, cyclic processing is achieved, and the processing efficiency is high.

According to a concept of the present invention, the extrusion pipe is cut off at one end of the opening of the molding cavity under the rotation of the dividing plate.

By adopting the above technical solutions, for the extrusion pipe corresponds to a molding cavity on the dividing plate in an initial state, and after the extrusion pipe is delivered into the molding cavity, the end face of the opening of the molding cavity is staggered and thereby the cutting-off is achieved under the rotation of the dividing plate.

According to a concept of the present invention, the dividing plate is provided with a feeding station in the same horizontal line with a discharging port of the extruder, and a first cutter driven by an air cylinder and performing a reciprocating motion in the end face direction of the opening is provided at the opening of the molding cavity.

By adopting the above technical solutions, the extrusion pipe extruded by the extruder is delivered into the molding cavity, and cut off by the first cutter to form an independent pipe member, which is the first step of the molding.

According to a concept of the present invention, a cylindrical core is provided in the molding cavity, and a driving air cylinder for driving the core to enter into/exit from the molding cavity is provided at the other end of the opening of the molding cavity.

By adopting the above technical solutions, when the pipe member enters the molding cavity with a core, the pipe member in a plastic melt state can be kept in a cylindrical shape in the first station; the core is driven by an air cylinder and thus removed from the molding cavity. That is, it is getting ready for the subsequent molding.

According to a concept of the present invention, the molding station is located downstream of the feeding station, and the molding station comprises a molding die set entering the molding cavity and the molding die set comprise a first molding die and a second molding die entering from the openings at both ends of the molding cavity, respectively, and the second molding die extrudes one end of the pipe member in a plastic melt state to form a limit end extending radially around a circle center of the pipe member.

By adopting the above technical solutions, the first molding die and the second molding die move towards each other, respectively, and thus a die joint is formed, and a limit end is formed at one end by extrusion.

According to a concept of the present invention, the second molding die is of a cylindrical shape, having a diameter smaller than that of the first molding die, which make an annular stop edge is formed on one end of the pipe member.

By adopting the above technical solutions, the annular stop edge is formed, and the stop edge can guarantee the end of the clamping ring and the installation pipe are in place.

According to a concept of the present invention, the second molding die is of a cylindrical shape, and notches are uniformly opened in the cylindrical circumferential edge, so as to form a plurality of blocks at one end of the pipe member.

By adopting the above technical solutions, notches are opened to form a plurality of blocks which can also guarantee the end of the clamping ring and the installation pipe are in place.

According to a concept of the present invention, an outer wall of the first molding die comprises a first tapered surface to define a first taper angle on an inner wall of the clamping ring, and a second tapered surface acting on an inner wall of corresponding end face of the clamping ring to define a second taper angle.

By adopting the above technical solutions, the first taper angle is formed at the other end, and the first taper angle can make the clamping ring fit closely outside the pipe in the installation process of the clamping ring; while the second taper angle can make the clamping ring easier to be located outside the pipe.

According to a concept of the present invention, a follow-up station of the molding station is a demolding station, and the demolding station comprises an ejection block driven by an air cylinder and acting on one end of the clamping ring.

By adopting the above technical solutions, the ejection block acts on an end of the clamping ring to remove the clamping ring from the molding cavity and achieve cutting-stock.

According to a concept of the present invention, at the demolding station, the first molding die driven by an air cylinder brings the clamping ring out of the molding cavity, wherein, a demolding slope is provided in the molding cavity and a stock-cutting ring is sleeved on the outer side of the first molding die.

By adopting the above technical solutions, under the action of the demolding slope, the clamping ring is brought out by the first molding die, and resisted by the stock-cutting ring in a raising process, to achieve cutting-stock.

According to a concept of the present invention, the molding apparatus comprises a molding cavity with an opening facing upward, and the extruder extrudes a specific amount of plastic materials upward, a rotary second cutter is provided above the extruder, the plastic materials are cut out by the second cutter and then placed on the second cutter, and delivered into the molding cavity through a pushing apparatus; a sealing cap driven by an air cylinder is provided above the opening of the molding cavity, and a core driven by the air cylinder is provided in the center of the sealing cap.

By adopting the above technical solutions, i.e., in a die casting manner, after the extruder extrudes a specific amount of plastic materials and the specific amount of plastic materials are delivered into the molding cavity, the top area is defined by the sealing cap, and then a core is fed into the molding cavity, and in this way, plastic materials in the molding cavity can be molded through die casting, for the purpose of fast molding.

According to a concept of the present invention, cooling pipes are arranged in the inner wall of the molding cavity.

By adopting the above technical solutions, cooling pipes are arranged in the inner wall of the molding cavity, so that the clamping ring within the molding cavity can be cooled by the cooling pipe in the molding process of the materials extruded by the extruder, which allows cooling and molding are performed synchronously and improve the processing speed.

According to another aspect of the present invention, there is provided an injection molding device for manufacturing a clamping ring, and by means of this injection molding device for manufacturing a clamping ring, the end of the clamping ring can be molded in a plastic melt state, which can optimize the production steps, and improve the production efficiency.

An injection molding machine for manufacturing a clamping ring, comprising: a stationary mold and a movable mold; wherein, a plurality of female dies are provided in the stationary mold, male dies corresponding to the female dies are provided in the movable mold, a cylindrical molding die is provided in the male die, the molding die is not in contact with the top wall of the female die, the female die cooperates with the male die to form a molding cavity, a molding cutter driven by a hydraulic mechanism is provided in the stationary mold; an injection mold injects plastic materials having memory properties through an injection gate to form a pipe member in the molding cavity, wherein the pipe member comprises a clamping ring and a sealing film provided on one end of the clamping ring, and then the hydraulic mechanism drives the molding cutter to cut out a joint of the sealing film and the clamping ring in a plastic melt state, thereby a limit end is formed at one end of the clamping ring.

By adopting the above technical solutions, an in-mold cutting process is adopted, and a molding cutter is introduced in the molding process to cut out the sealing film of the pipe member, and in this way, the clamping ring can be molded all at once.

DETAILED DESCRIPTION

The present invention will be described in detail with reference to the accompanying drawings.

Embodiment 1

Figure 1:
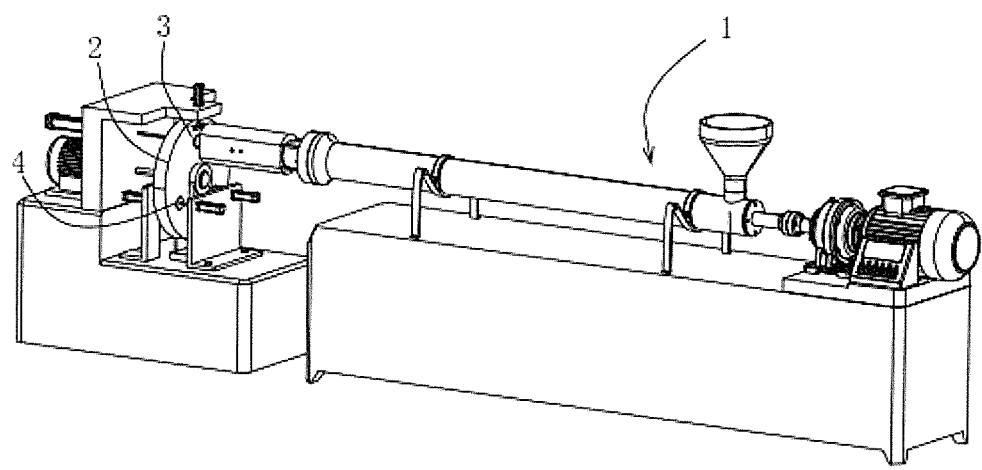
FIG. 1 is an overall schematic diagram of an extruder according to Embodiment 1.
Figure 2:
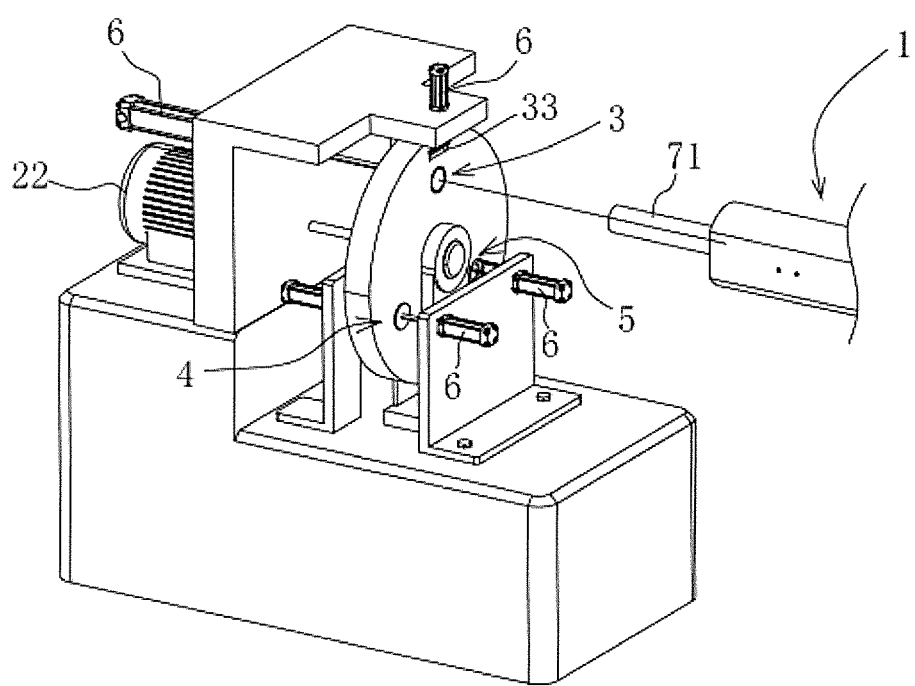
FIG. 2 is a schematic diagram of a molding part of an extruder according to Embodiment 1.
Figure 3:
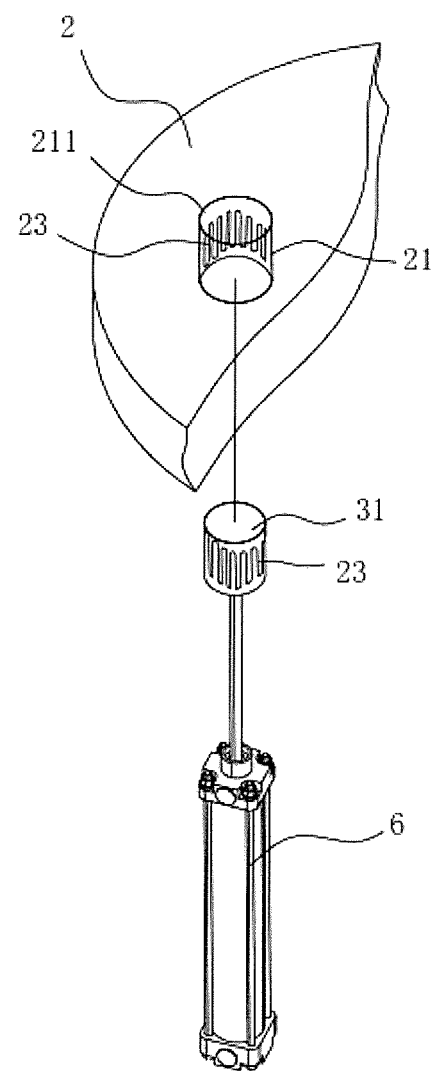
FIG. 3 is an exploded schematic diagram of a feeding station of a dividing plate according to Embodiment 1.

Referring to FIGS. 1, 2 and 3, a device for manufacturing a clamping ring comprises an extruder 1, wherein an extrusion screw is provided in the cylinder section of the extruder 1, a feed hopper with an opening 211 facing upward is provided on the cylinder section, and a discharging port is provided outside the cylinder section. Raw materials for plastic materials adopted are materials such as cross-linked polyethylene (PEX) or cross-linked polypropylene, preferably PEX-B.

Figure 4:
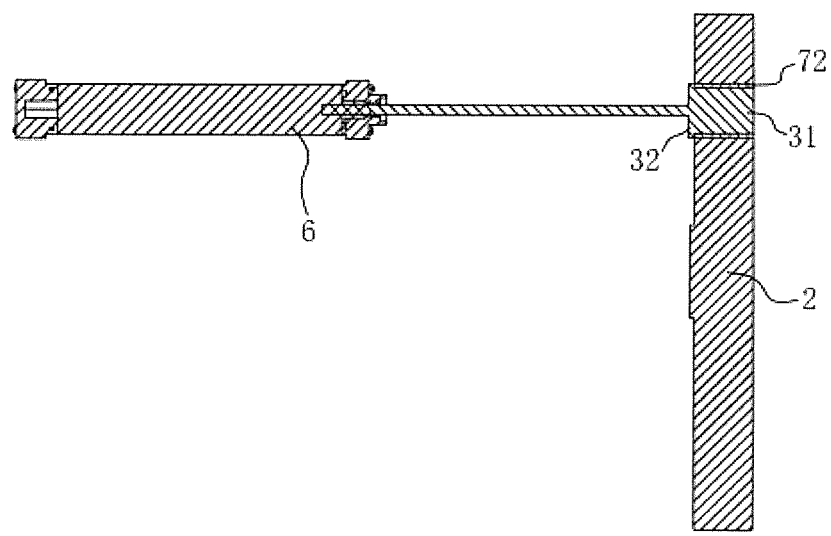
FIG. 4 is a cross-sectional view of a feeding station according to Embodiment 1.

Referring to FIGS. 2, 3 and 4, the extruder 1 can extrude horizontally, or can extrude an extrusion pipe 71 in a vertical upward direction; a dividing plate 2 is adjacent to the discharging port and rotated under the control of a servo motor 22, and a plurality of concave molding cavities 21 are defined on the dividing plate 2; the molding cavity 21 is provided with an opening 211 facing the direction of the discharging port, for entrance of the extrusion pipe 71 extruded by the extrusion screw; a cylindrical core 31 is provided in each molding cavity 21, with a length extending to the end face where the opening 211 is located; the core 31 is provided with a base 32 in a direction facing away from the discharging port, the base 32 is integrally formed with the core 31, and the base 32 blocks the other opening 211 of the molding cavity 21; a driving air cylinder 6 is connected outside the base 32, and the driving air cylinder 6 is used to exit the core 31 from the molding cavity 21 and send the exited core 31 back to the molding cavity 21.

With reference to FIG. 4, the molding cavity 21 rotates by some angle along with the dividing plate 2; a plurality of stations are arranged on circumferential positions of the dividing plate 2, and each of the plurality of stations has a respective set position and is used to process a pipe member 72 in the molding cavity 21 when the pipe member 72 has already rotated to the set position; after the molding cavity 21 of the dividing plate 2 is rotated to the set position, corresponding station performs corresponding processing on the molding cavity 21.

In particular, a feeding station 3 is provided in the same straight line of the discharging port of the extruder 1 and comprises a first cutter 33 provided above a corresponding position of the molding cavity 21, and the first cutter 33 abuts against the end face of the opening 211 of the dividing plate 2, and thus the first cutter 33 performs a reciprocating motion in the end face direction of the opening 211 driven by the driving air cylinder 6. Particularly, the reciprocating motion of the first cutter 33 can be either in a vertical direction or in a horizontal direction. The extrusion pipe 71 extruded by the extrusion screw is delivered into the molding cavity 21 corresponding to the feeding station 3 until the molding cavity 21 with the opening 211 is filled with sufficient materials for forming the clamping ring 7, further, one end of the pipe member 72 is cut by the first cutter 33 to form an independent pipe member 72. When the pipe member 72 enters the molding cavity 21 with the core 31, the pipe member 72 in a plastic melt state can be kept in a cylindrical shape in the first station, to avoid deformation.

Figure 9:
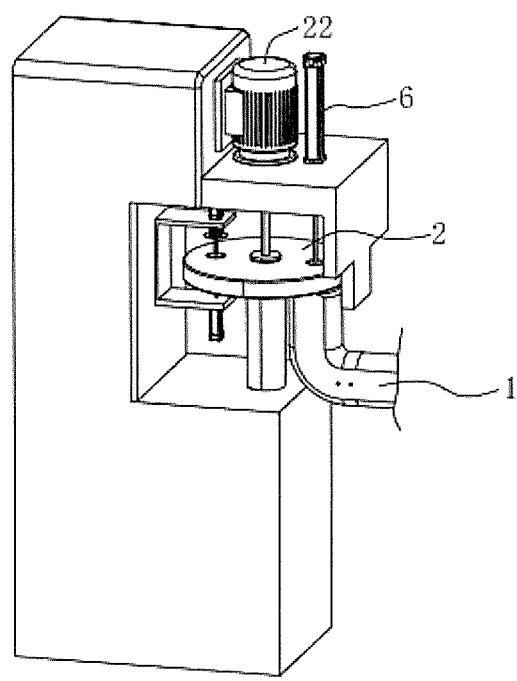
FIG. 9 is a schematic diagram of another demolding station according to Embodiment 1.

Referring to FIG. 9, as an alternative embodiment of this embodiment, the feeding station 3 is not provided with the first cutter 33, and the extrusion pipe 71 corresponds to one molding cavity 21 in the dividing plate 2; after the extrusion pipe 71 is delivered into the molding cavity 21, the end face of the opening 211 is staggered and thereby cutting-off is achieved under the rotation of the dividing plate 2.

Referring to FIG. 3, each molding cavity 21 is arranged with cooling pipes 23, and cooling pipes 23 are arranged in an S-like shape to achieve a better effect of distribution. Further, cooling pipes 23 are also arranged in an outer circumference surface of the core 31, which allows to synchronous performance of cooling and molding, and thereby improve the processing speed.

Figure 5:
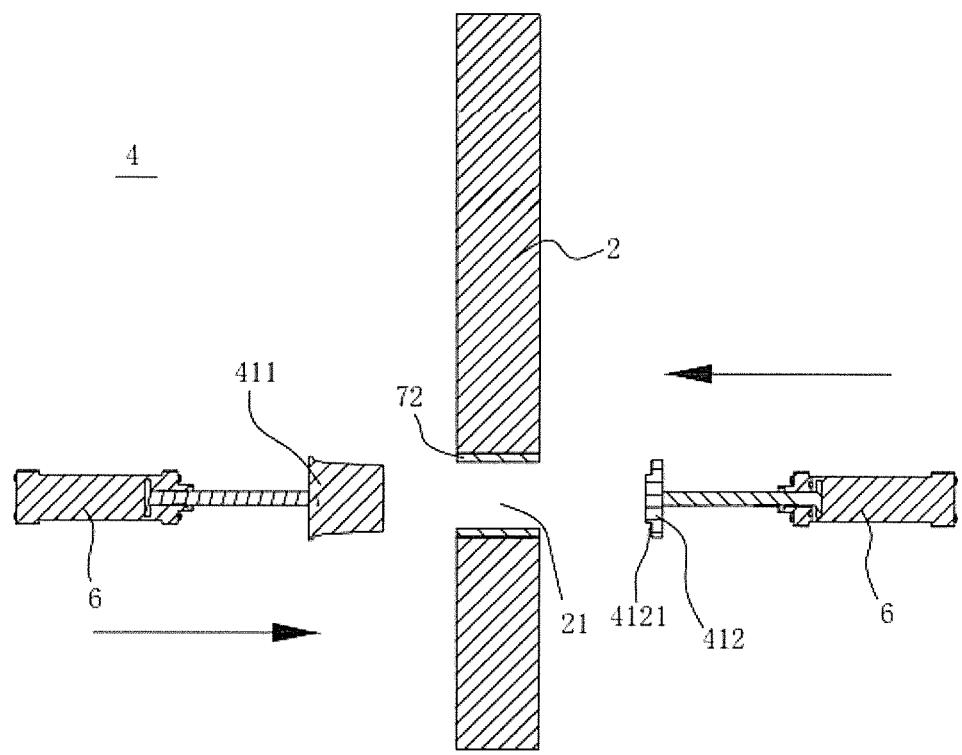
FIG. 5 is a cross-sectional view of a station according to Embodiment 1 when a molding die set of the molding station doesn't mold the pipe member.
Figure 7:
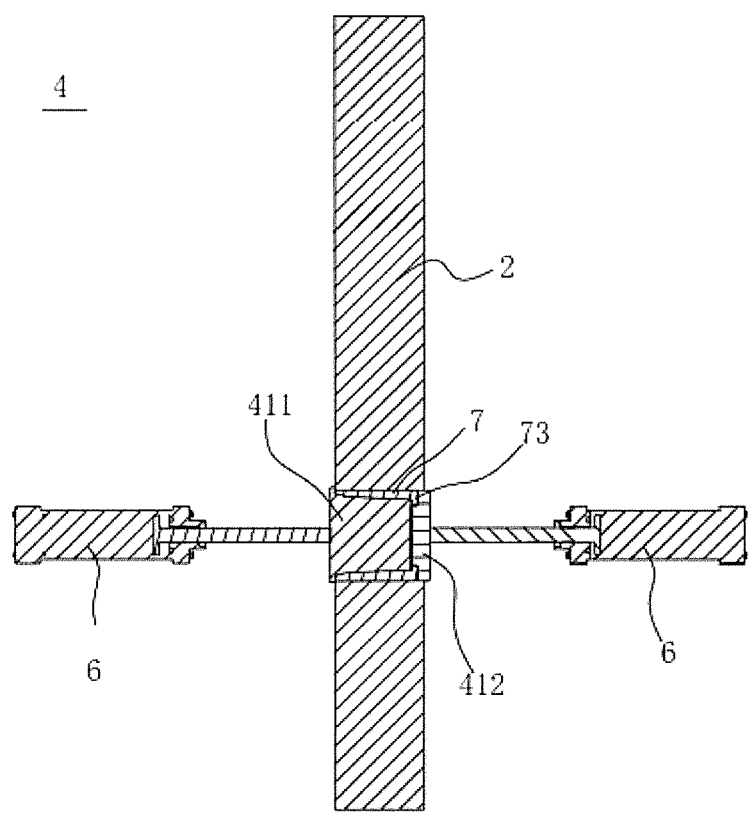
FIG. 7 is a cross-sectional view of a station according to Embodiment 1 when a molding die set of the molding station molds the pipe member.

Referring to FIGS. 5 and 7, the molding cavity 21 and the pipe member 72 disposed within the molding cavity 21 are rotated by the dividing plate 2 to a next molding station 4, and in the process of rotating to the molding station 4, a driving air cylinder 6 exits the core 31 from the molding cavity 21, and when rotated to the position where the molding station 4 is located, the molding cavity 21 has an opening 211 communicating at both ends. The molding station 4 is provided with a molding die set 41, and the molding die set 41 comprises a first molding die 411 and a second molding die 412 entering from openings 211 at both ends of the molding cavity 21. The second molding die 412 is used to form a limit end 73 of the clamping ring 7, and the die joint of the first molding die 411 and the second molding die 412 is the interface between the limit end 73 and the clamping ring 7. In this embodiment, the portion of the first molding die 411 that is contact with the second molding die 412 is a cylinder with a diameter less than that of the first molding die 411, to form an annular groove 4121, and accordingly, the limit end 73 of the clamping ring 7 is an annular stop edge, and the stop edge can guarantee the end of the clamping ring 7 and the installation pipe are in place. As another variant of this embodiment, the second molding die 412 is of a cylindrical shape, and diameters of the second molding die 412 and the first molding die 411 are substantially the same, and notches (not shown) are uniformly defined in the cylindrical circumferential edge, so as to form several protrusions on the pipe member 72, and also to guarantee the end of the clamping ring 7 and the installation pipe are in place. The premise of adopting the above method is that, the length of the molding cavity 21 and the core 31 having the same length with the molding cavity 21 is slightly greater than that of the clamping ring 7, and therefore, in the process of pipe member 72 being extruded to shape by the moving of the first molding die 411 and the second molding die 412 towards each, the resultant materials can be extruded into a space formed by the limit end 73, thus forming a corresponding structure.

Figure 6:
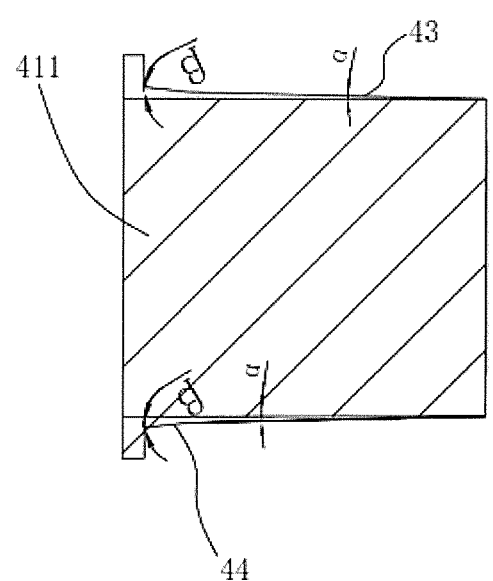
FIG. 6 is an individual schematic diagram of a first molding die according to Embodiment 1.

Referring to FIG. 6, as another variant of this embodiment, in terms of the first molding die 411, an outer wall of the first molding die 411 comprises a second tapered surface 44 acting on another face of the clamping ring 7 relative to the limit end 73 to define a second taper angle $\beta$, and the second taper angle $\beta$ can be within a range of 3 to 7 degrees, and make the clamping ring 7 easier to be located outside the pipe. The outer wall of the first molding die 411 comprises a first tapered surface 43 connected to the second tapered surface 44, and the first tapered surface 43 acts on an inner wall of the clamping ring 7 other than the inner walls of the second taper angle and the limit end 73 to define a first taper angle $\alpha$, and the first taper angle $\alpha$ can be within a range of 0.1 to 2 degrees, and make the clamping ring 7 fit closely outside the pipe in the installation process of the clamping ring 7.

In this embodiment, the first molding die 411 and the second molding die 412 are driven by an air cylinder 6, and after a product is molded by the first molding die 411 and the second molding die 412, the air cylinder 6 drives the first molding die 411 and the second molding die 412 to completely exit from the molding cavity 21, that is, the molding cavity 21 is rotated by the dividing plate 2 to the next station when a pipe member 72 is provided in the molding cavity 21 with openings 211 at both ends thereof.

Figure 8:
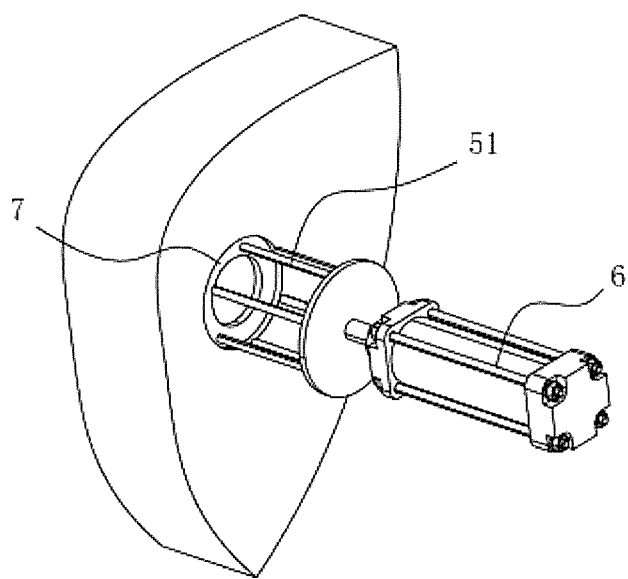
FIG. 8 is a schematic diagram of a demolding station according to Embodiment 1.

Referring to FIG. 8, as another variant of this embodiment, a follow-up station of the molding station 4 is a demolding station 5, and the demolding station 5 comprises an ejector pin 51 driven by the air cylinder 6, and an ejector pin 51 act on one end face of the clamping ring 7, of course, it also can be an ejection block, playing roles of ejecting and cutting stock. The clamping ring 7 is completely ejected from the molding cavity 21, to realize cutting-stock.

Figure 10:
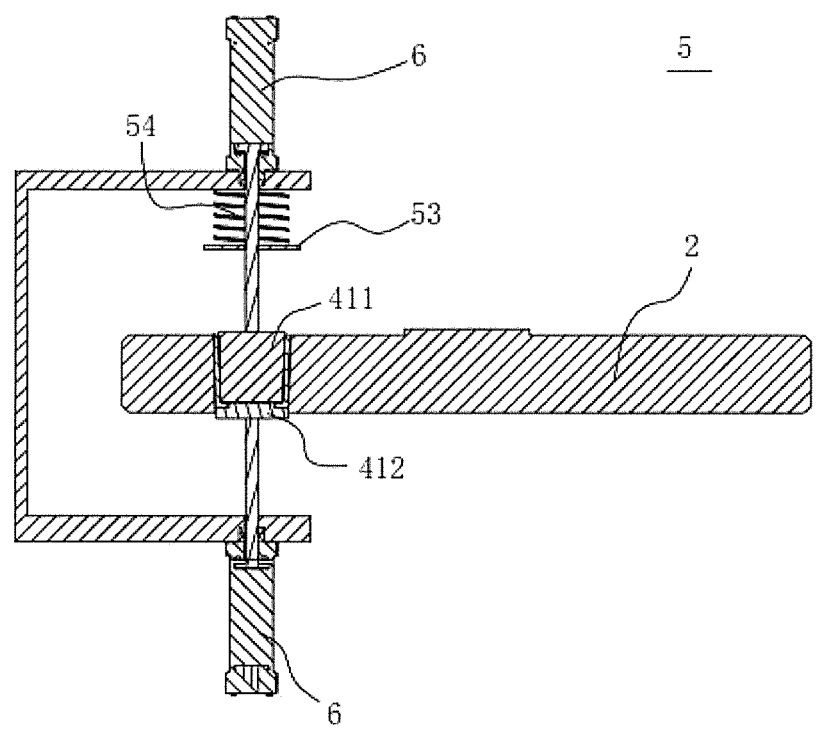
FIG. 10 is a cross-sectional view of another demolding station according to Embodiment 1 when demolding is not performed.
Figure 11:
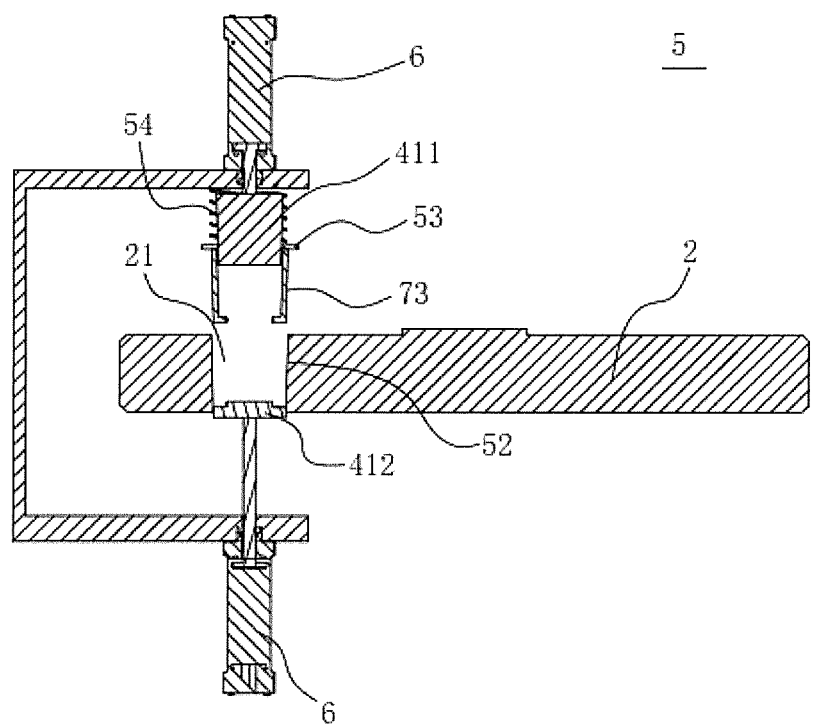
FIG. 11 is a cross-sectional view of another demolding station according to Embodiment 1 when demolding is performed.

Referring to FIGS. 9, 10 and 11, as another variant of this embodiment, the method is applied to the case that the extruder 1 extrudes an extrusion pipe in a vertical upward direction. At the demolding station, the first molding die 411 driven by an air cylinder 6 brings the clamping ring 7 out of the molding cavity 21; a demolding slope 52 is provided in the molding cavity 21, and a stock-cutting ring 53 is sleeved on the outer side of the first molding die 411, and a spring 54 is provided above the stock-cutting ring 53; under the action of the demolding slope 52, the clamping ring 7 is brought out of the molding cavity 21 by raising of the first molding die 411, and resisted by the stock-cutting ring 53 in a raising process, to achieve cutting-stock under the action of the spring 54.

Figure 12:
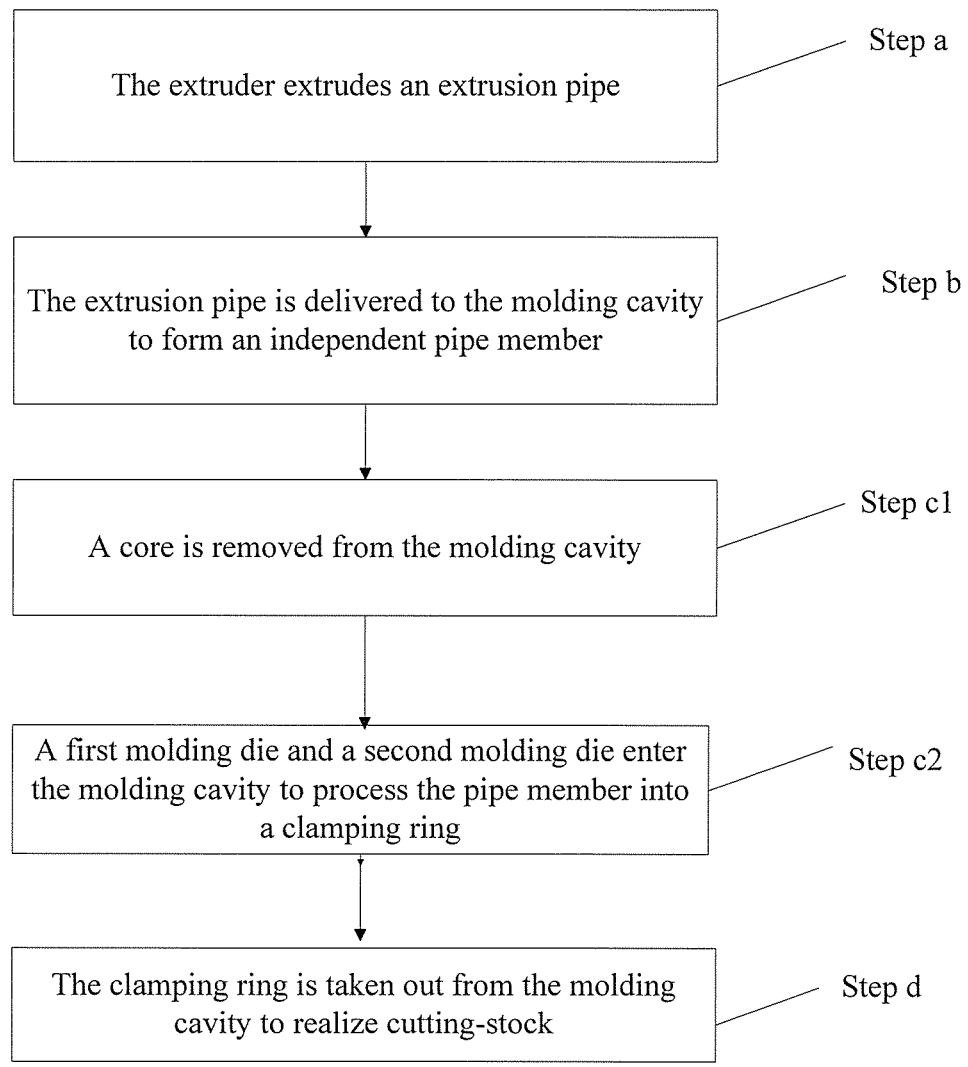
FIG. 12 is a flow chart of a processing method according to Embodiment 1.

Referring to FIG. 12, a method for manufacturing a clamping ring configured for use on a pipe joint, sequentially comprises: (a) an extruding step of extruding continuous tubular extrusion pipe 71 having memory properties from an extruder 1; (b) an in-mold step of cutting the extrusion pipe 71 at the other end after being delivered in the molding cavity 21, to form an independent pipe member 72; (c) a molding step, particularly comprising (c1) a core-removing step of removing a core 31 from the molding cavity 21 and forming openings 211 at both ends of the molding cavity 21; (c2) an extrusion molding step, wherein a first molding die 411 and a second molding die 412 enter the molding cavity 21 from the openings 211 at both ends of the molding cavity 21, respectively, and the second molding die 412 extrudes one end of the pipe member 72 in a plastic melt state and forms a limit end 73 extending radially around a circle center of the pipe member 72, and thereby, the pipe member 72 forms a clamping ring 7; and (d) a demolding step of taking out the pipe member 72 from the molding cavity 21 to realize cutting-stock.

Embodiment 2

Figure 13:
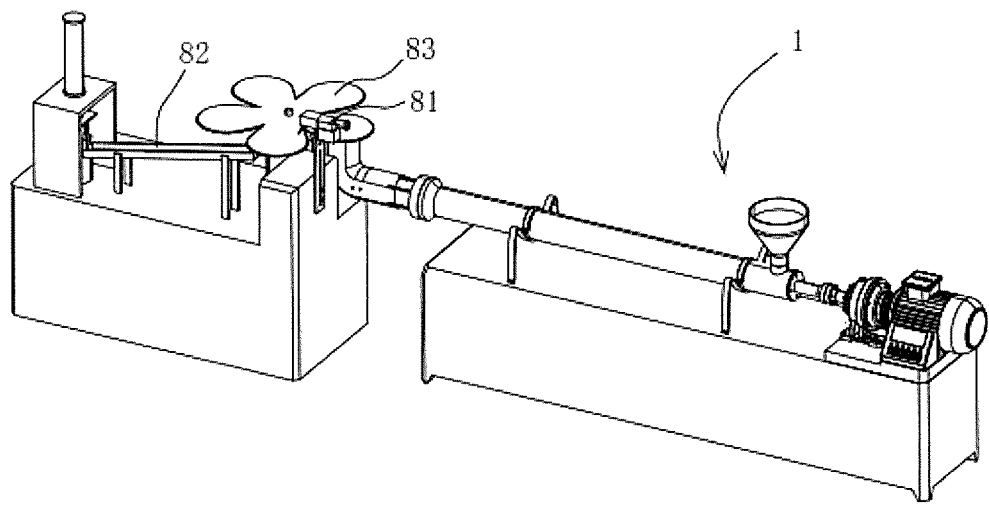
FIG. 13 is an overall schematic diagram of an extruder according to Embodiment 2.
Figure 14:
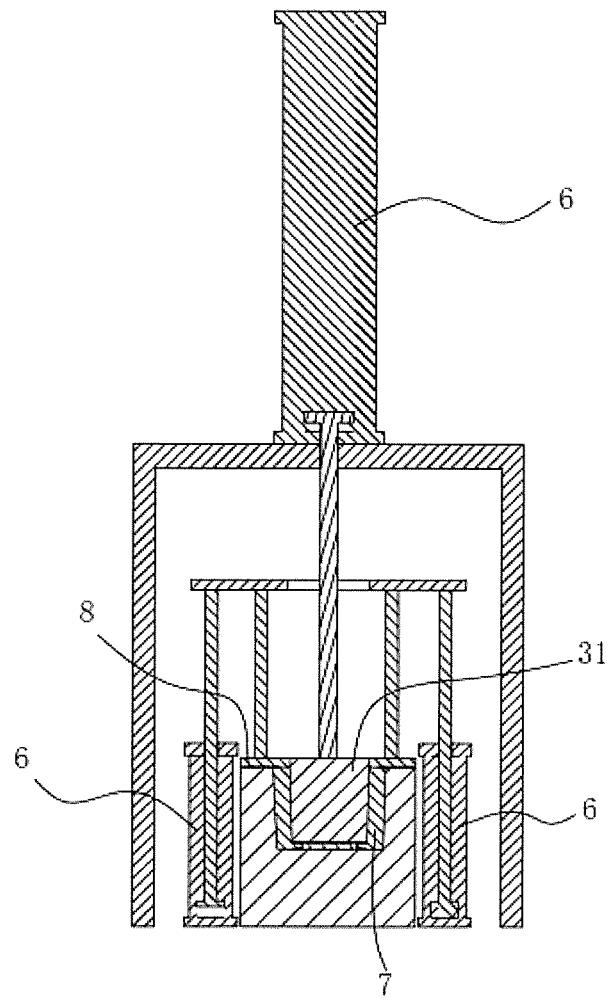
FIG. 14 is a cross-sectional view of a molding part according to Embodiment 2.
Figure 15:
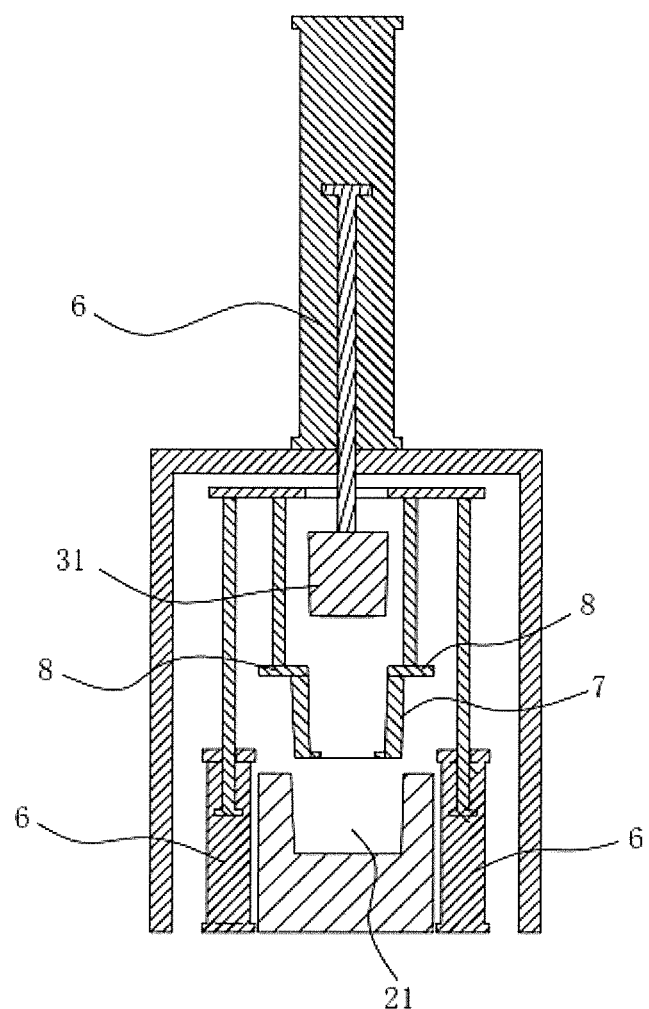
FIG. 15 is a cross-sectional view of a molding part in a demolding state according to Embodiment 2.

Referring to FIGS. 13, 14 and 15, the upward molding apparatus of the extruder 1 comprises a molding cavity 21 with an opening 211 facing upward; and the extruder 1 extrudes a specific amount of plastic materials upward, and a rotary second cutter 83 is provided above the extruder 1, then the plastic materials are cut out by the second cutter 83 and then placed on the second cutter 83, and delivered into the molding cavity 21 through a pushing apparatus; the pushing apparatus can be a blow pipe 81, and gas blown through the blow pipe 81 sends the plastic materials into a rail 82, the rail 82 extends above the molding cavity 21 so as to deliver the plastic materials into the molding cavity 21. A sealing cap 8 driven by an air cylinder 6 is provided above the opening 211 of the molding cavity 21, and a core 31 driven by the air cylinder 6 is provided in the center of the sealing cap 8. The demolding manner is that, the first molding die 411 driven by an air cylinder 6 brings the clamping ring 7 out of the molding cavity 21, and under the action of the demolding slope 52 being provided in the molding cavity 21, the clamping ring 7 is brought out by the first molding die 411, and resisted by the sealing cap 8 in a raising process, to achieve cutting-stock.

Figure 16:
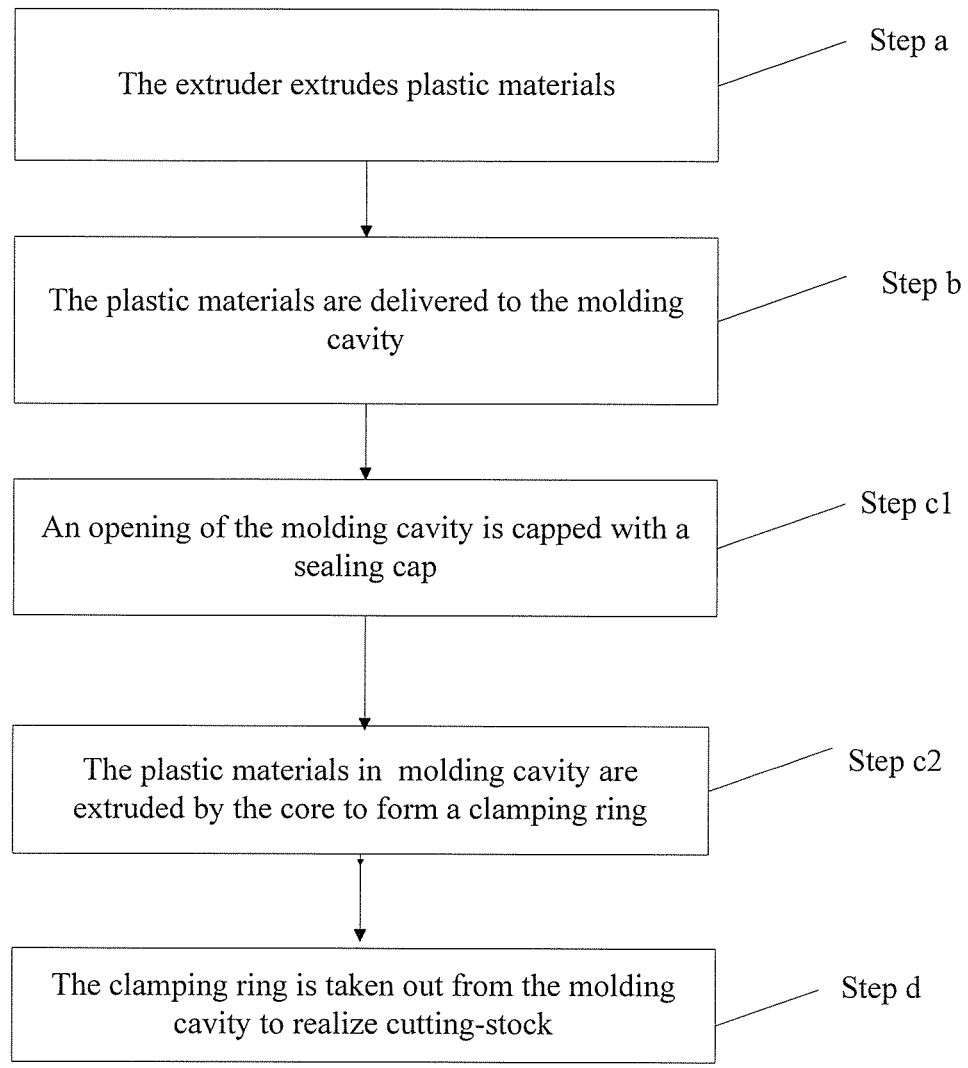
FIG. 16 is a flow chart of a processing method according to Embodiment 2.
Figure 17:
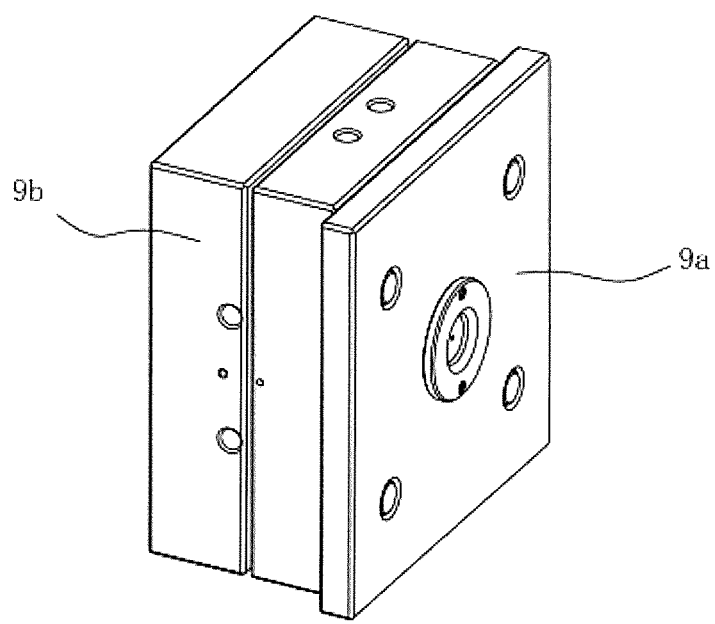
FIG. 17 is a schematic diagram of a mold clamping state according to Embodiment 3.
Figure 18:
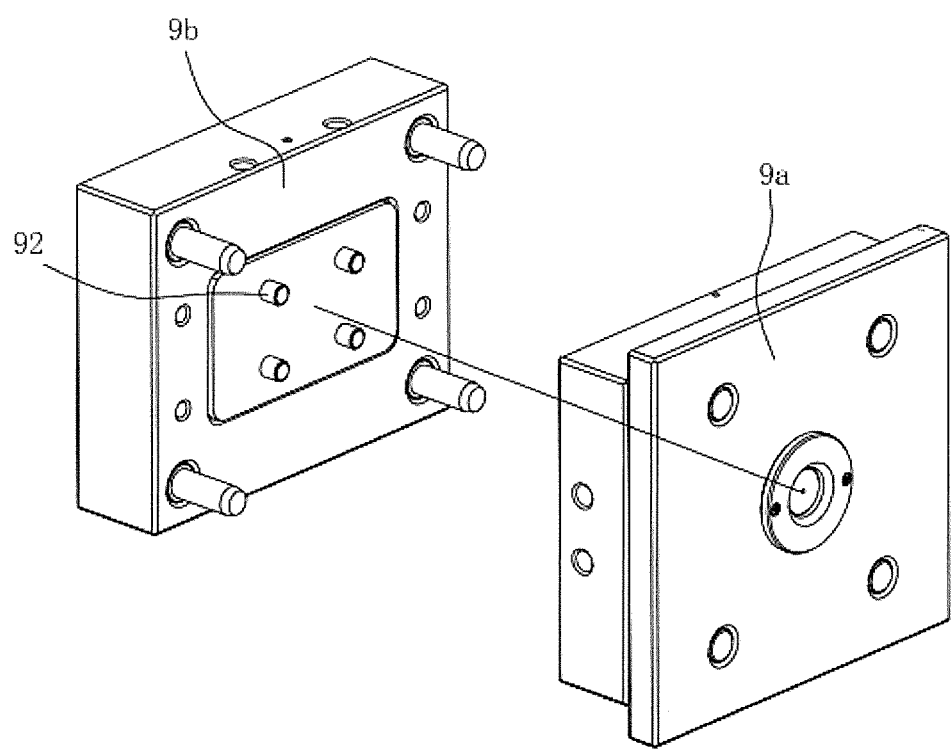
FIG. 18 is an exploded schematic diagram of a stationary mold plate and a movable mold holder according to Embodiment 3.
Figure 19:
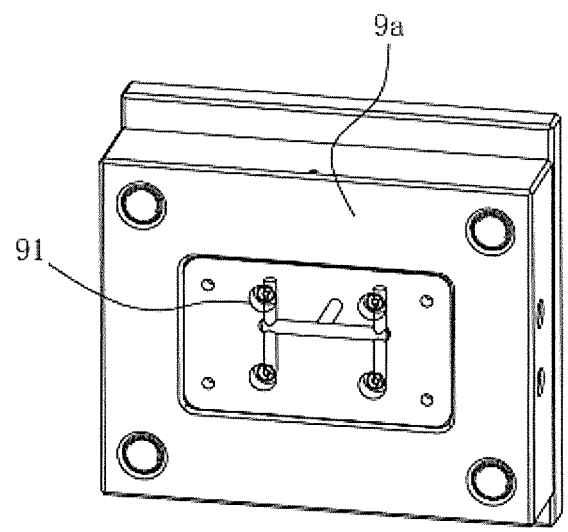
FIG. 19 is an individual schematic diagram of a stationary mold plate according to Embodiment 3.
Figure 20:
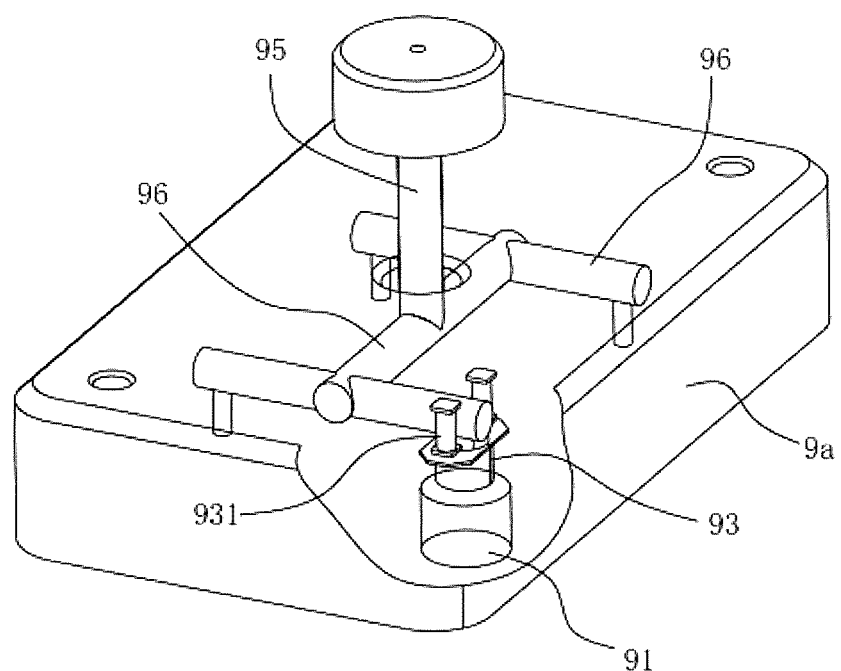
FIG. 20 is an individual schematic diagram of a movable mold holder according to Embodiment 3.

Referring to FIG. 16, a method for manufacturing a clamping ring configured for use on a pipe joint, sequentially comprises: (a) an extruding step of extruding continuous tubular plastic materials (in irregular clusters) having memory properties from an extruder 1; (b) An in-mold step of delivering plastic materials into the molding cavity; (c) A molding step, particularly comprising: (c1) a cap-sealing step of capping a sealing cap 8 at an upper opening of the molding cavity 21, wherein a through hole is defined in a center of the sealing cap 8; (c2) an in-core molding step of dropping the core 31 into the molding cavity 21 via the through hole and extruding the plastic materials in the molding cavity 21 to form a clamping ring 7 with a sealing film; (d) A demolding step of taking out the pipe member 72 from the molding cavity 21 to realize cutting-stock.

A die casting manner is adopted during the implementation of this embodiment. After the extruder 1 extrudes a specific amount of plastic materials, the specific amount of plastic materials are delivered into the molding cavity 21, and the top area is defined by the sealing cap 8, and then a core 31 is fed into the molding cavity. In this way, plastic materials in the molding cavity 21 can be molded through die casting, for the purpose of fast molding.

Embodiment 3

Referring to FIG. 17 to FIG. 20, an injection molding machine for manufacturing a clamping ring comprises: a stationary mold and a movable mold; a plurality of female dies 91 are provided in a stationary mold plate 9a of the stationary mold, and there are four female dies 91 in this embodiment; male dies 92 corresponding to the female dies 91 are provided in a movable mold holder 9b of the movable mold, the male die 92 is the cylindrical core 31, and the core 31 is not in contact with the top wall of the female die 91, and the female die 91 cooperates with the male die 92 to form a molding cavity 94. An injection mold sequentially injects plastic materials having memory properties into the molding cavity 94 through a main flow passage 95 and a branched flow passage 96 respectively, to form a pipe member 72 in the molding cavity 94, and the pipe member 72 comprises a clamping ring 7 and a sealing film provided on one end of the clamping ring 7.

Figure 21:
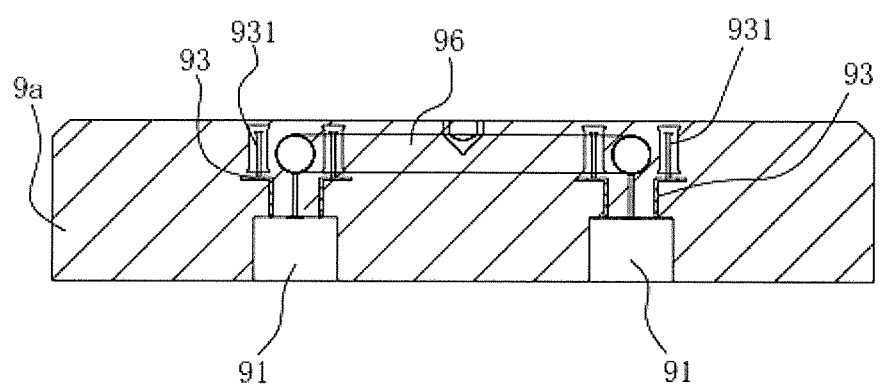
FIG. 21 is a cross-sectional view of a stationary mold plate in a non-operational state according to Embodiment 3.
Figure 22:
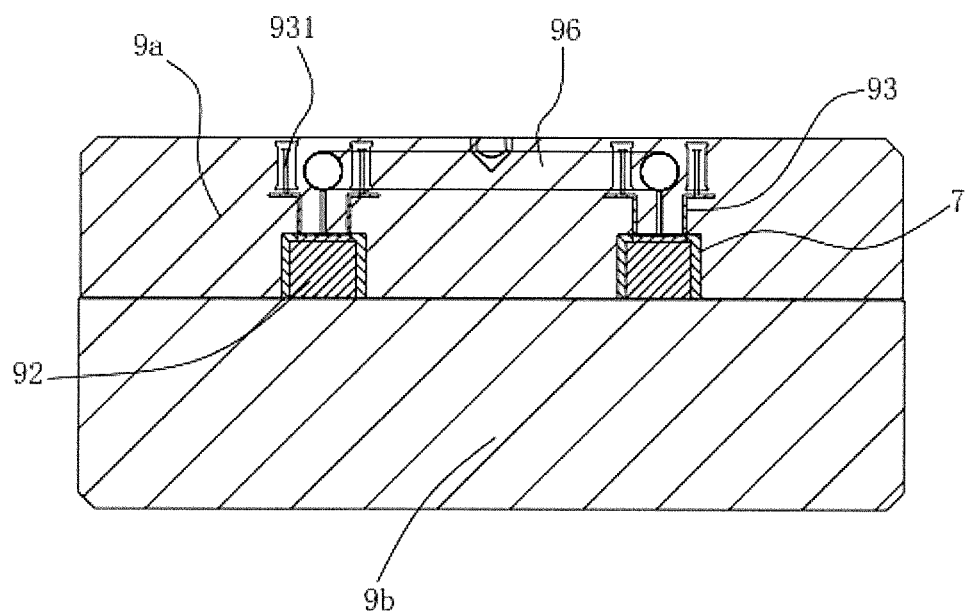
FIG. 22 is a cross-sectional view of a mold clamping state according to Embodiment 3.

Referring to FIG. 21 and FIG. 22, a molding cutter 93 driven by a hydraulic mechanism 931 is provided in the stationary mold; the hydraulic mechanism 931 drives the molding cutter 93 to cut out a joint of the sealing film and the clamping ring 7 in a plastic melt state, thereby forming a limit end 73 at one end of the clamping ring 7. The limit end 73 can be an annular stop edge formed on end of the clamping ring 7 by the annular second cutter 83.

As another variant of this embodiment, several protrusions extending radially are formed at ends of the clamping ring 7 by the second cutter 83, and there are three protrusions in this embodiment.

An injection gate can be provided in the center of the sealing film, and there are weld lines at the top in this injection molding scheme. Preferably, in this scheme, three concave grooves are provided in a central divergent shape at the bottom of the female die 91 of the molding cavity 21, and thereby, during the injection molding process, the central injection gate will inject to the molding cavity 94 along with the flow passage formed by the concave grooves, achieving a scheme similar to three injection gates.

Referring to FIG. 6, in terms of the molding die, an outer wall of the molding die comprises a second tapered surface 44 acting on another face of the clamping ring 7 relative to the limit end 73 to define a second taper angle $\beta$, and the second taper angle $\beta$ can be within a range of 3 to 7 degrees, and make the clamping ring 7 easier to be located outside the pipe. The outer wall of the molding die comprises a first tapered surface 43 connected to the second tapered surface 44, and the first tapered surface 43 acts on an inner wall of the clamping ring 7 other than the inner walls of the second taper angle $\beta$ and the limit end 73 to define a first taper angle $\alpha$, and the first taper angle $\alpha$ can be within a range of 0.1 to 2 degrees, and make the clamping ring 7 fit closely outside the pipe in the installation process of the clamping ring 7.

Figure 23:
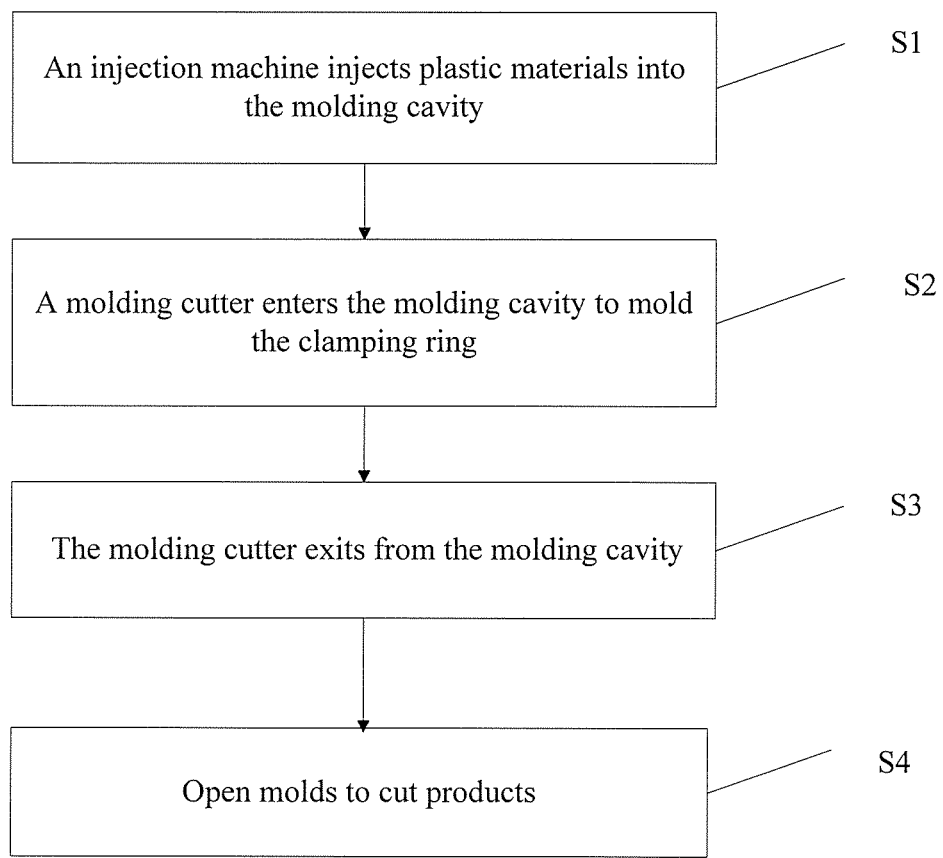
FIG. 23 is a flow chart of a processing method according to Embodiment 3.

FIG. 23 shows a method for manufacturing a clamping ring 7 in this embodiment, and the method comprises: S1, an injection molding step of injecting plastic materials having memory properties through an injection gate of an injection molding machine into a molding cavity 94 to form a cylindrical clamping ring 7 and a sealing film attached on one end of the clamping ring 7, wherein raw materials for plastic materials adopted are materials such as cross-linked polyethylene (PEX) or cross-linked polypropylene, preferably PEX-B; S2, a molding step of introducing a molding cutter 93 into the molding cavity 94 and acting on a joint of the sealing film and the clamping ring 7 in a plastic melt state under a pressure-holding state; S3, a cutter exiting step of restoring the molding cutter 93 into an initial position; and S4, a mold opening step of separating a stationary mold and a movable mold of the injection molding machine, and ejecting the clamping ring 7 from the molding cavity 94 via the ejector pin 51 for cutting-stock.

To sum up, the method, the extruder 1 and the injection molding machine for manufacturing a clamping ring according to the present invention all mold the pipe member 72 in a plastic melt state to a finished clamping ring 7, so that the production steps are optimized, and the production efficiency are improved.

The above specific embodiments are merely to explain the present invention and are not intended to limit the present invention. Persons skilled in the art can make modifications without creative contributions to these embodiments as needed after reading this specification, and such modifications are also encompassed within the scope of the present invention set forth in the accompanying claims.

What is claimed is:

1. A device for manufacturing a clamping ring, comprises: an extruder, wherein, a molding apparatus is provided adjacent to one side of the extruder, the molding apparatus is provided with a molding cavity, plastic materials having memory properties are extruded from the extruder and put into the molding cavity, and with the molding apparatus acting on the plastic materials in a plastic melt state to form the clamping ring;

wherein the extruder extrudes a continuous tubular extrusion pipe having memory properties, the molding apparatus is a dividing plate rotatable along a circle center, a plurality of molding cavities rotating along with the dividing plate are arranged in the circumferential direction of the dividing plate, each molding cavity has an opening towards the direction of the extruder for entrance of the continuous tubular extrusion pipe, an independent pipe member is formed after the continuous tubular extrusion pipe is entered into the molding cavity, and the independent pipe member in a plastic melt state rotates with the dividing plate and is acted in a molding station by a molding die set, to form the clamping ring;

wherein a cylindrical core is provided in the molding cavity, and a driving air cylinder for driving the cylindrical core to enter into or exit from the molding cavity is provided at the other end of the opening of the molding cavity; and wherein the molding station comprises the molding die set entering the molding cavity and the molding die set comprises a first molding die and a second molding die entering from the openings at both ends of the molding cavity, respectively, and the second molding die stamps one end of the independent pipe member in a plastic melt state to form a limit end extending radially around a circle center of the independent pipe member.

2. The device for manufacturing the clamping ring according to claim 1, wherein the continuous tubular extrusion pipe is cut off at one end of the opening of the molding cavity under the rotation of the dividing plate.

3. The device for manufacturing the clamping ring according to claim 1, wherein the dividing plate is provided with a feeding station in the same horizontal line as a discharging port of the extruder, and a first cutter driven by an air cylinder that performs a reciprocating motion in the end face direction of the molding cavity opening.

4. The device for manufacturing the clamping ring according to claim 1, wherein the second molding die is of a cylindrical shape, having a diameter smaller than that of the first molding die, and the second molding die makes an annular stop edge on one end of the independent pipe member.

5. The device for manufacturing the clamping ring according to claim 1, wherein the second molding die is of a cylindrical shape, and notches are uniformly opened in the cylindrical circumferential edge, so as to form a plurality of blocks at one end of the independent pipe member.

6. The device for manufacturing the clamping ring according to claim 1, wherein an outer wall of the first molding die comprises a first tapered surface to define a first taper angle on an inner wall of the clamping ring, and a second tapered surface acting on an inner wall of corresponding end face of the clamping ring to define a second taper angle.

7. The device for manufacturing the clamping ring according to claim 1, wherein a follow-up station of the molding station is a demolding station, and the demolding station comprises an ejection block driven by an air cylinder and acting on one end of the clamping ring.

8. The device for manufacturing the clamping ring according to claim 7, wherein at the demolding station, the first molding die driven by an air cylinder brings the clamping ring out of the molding cavity, wherein, a demolding slope is provided in the molding cavity and a stock-cutting ring is sleeved on the outer side of the first molding die.

9. The device for manufacturing the clamping ring according to claim 1, wherein the molding apparatus comprises a molding cavity with an opening facing upward, and the extruder extrudes a specific amount of the plastic materials upward, a rotary second cutter is provided above the extruder, the plastic materials are cut out by the rotary second cutter and then placed on the rotary second cutter, and delivered into the molding cavity through a blow pipe; a sealing cap driven by an air cylinder is provided above the opening of the molding cavity, and a core driven by the air cylinder is provided in the center of the sealing cap.

10. The device for manufacturing the clamping ring according to claim 1, wherein cooling pipes are arranged in the inner wall of the molding cavity.

\* \* \* \* \*